United States Patent [19]
Sako et al.

[11] Patent Number: 6,005,839
[45] Date of Patent: Dec. 21, 1999

[54] DATA TRANSMITTING METHOD, DATA RECORDING APPARATUS, DATA RECORD MEDIUM AND DATA REPRODUCING APPARATUS

[75] Inventors: Yoichiro Sako, Chiba; Yoshitomo Osawa, Kanagawa; Akira Kurihara, Kanagawa; Isao Kawashima, Kanagawa; Shozo Masuda, Tokyo; Hideo Owa, Kanagawa, all of Japan

[73] Assignee: Sony Corporation, Tokyo, Japan

[21] Appl. No.: 08/694,267

[22] Filed: Aug. 8, 1996

[30] Foreign Application Priority Data

Aug. 10, 1995 [JP] Japan .................................. 7-204483
Apr. 25, 1996 [JP] Japan .................................. 8-105569

[51] Int. Cl.$^6$ .............................. G11B 7/24; G11B 23/28
[52] U.S. Cl. ......................................... 369/275.3; 380/3
[58] Field of Search ......................... 380/3, 4, 5; 369/43, 369/47, 48, 84, 272, 275.3

[56] References Cited

U.S. PATENT DOCUMENTS

| | | | |
|---|---|---|---|
| 4,595,950 | 6/1986 | Lofberg | 369/84 |
| 5,428,598 | 6/1995 | Veldhuis et al. | 369/275.3 |
| 5,453,968 | 9/1995 | Veldhuis et al. | 369/84 |
| 5,513,260 | 4/1996 | Ryan | 380/3 |
| 5,646,966 | 7/1997 | Chaki et al. | 375/368 |
| 5,696,757 | 12/1997 | Ozaki et al. | 369/275.4 |
| 5,701,310 | 12/1997 | Deguchi et al. | 371/30 |
| 5,745,454 | 4/1998 | Yokota | 369/48 |
| 5,761,301 | 6/1998 | Oshima et al. | 380/4 |
| 5,761,302 | 6/1998 | Park | 380/5 |
| 5,787,068 | 7/1998 | Arps et al. | 369/275.3 |
| 5,802,174 | 9/1998 | Sako et al. | 380/4 |
| 5,809,545 | 9/1998 | Ozaki et al. | 380/3 |

*Primary Examiner*—Harshad Patel
*Assistant Examiner*—Robin Clark
*Attorney, Agent, or Firm*—Frommer Lawrence & Haug, LLP.; William S. Frommer; Dennis M. Smid

[57] ABSTRACT

A data transmitting method for preventing direct copying of digital bi-level signals. When processing input digital data from an input terminal 11 by circuits 13 to 16, modulating the data by a modulation circuit 17 and appending synchronization signals by a synchronization appendage circuit 18, the synchronization signals are appended using a synchronization format which is different from the synchronization format conforming to the standard and which is usually not used. For example, the synchronization pattern different from the regular synchronization pattern may be used, or the synchronization signal may be inserted at a position different from the regular position. If attempts are made for direct copying of the digital bi-level signal having such synchronization format, synchronization may be disengaged, for example, thus obstructing and prohibiting duplication.

10 Claims, 15 Drawing Sheets

| SYNCHRONI-ZATION WORDS | CODE WORDS | | | |
|---|---|---|---|---|
| | SYNCHRONIZATION PATTERNS a | | SYNCHRONIZATION PATTERNS b | |
| | msb | lsb | msb | lsb |
| S0 | 0001001001000000000001 | | 1001001001000000000001 | |
| S1 | 0001000001000000000001 | | 1001000001000000000001 | |
| S2 | 0000010001000000000001 | | 1000010001000000000001 | |

FIG.4

(a) STATES 1 AND 2

|  | (MSB) | (LSB) | (MSB) | (LSB) |
|---|---|---|---|---|
| SY0 = | 0001001001000100 | 0000000000010001 | 0001001000000100 | 0000000000010001 |
| SY1 = | 0000010000000100 | 0000000000010001 | 0000010001001000 | 0000000000010001 |
| SY2 = | 0001000000000100 | 0000000000010001 | 0001000001000100 | 0000000000010001 |
| SY3 = | 0000100000000100 | 0000000000010001 | 0000100001000100 | 0000000000010001 |
| SY4 = | 0010000000000100 | 0000000000010001 | 0010000001000100 | 0000000000010001 |
| SY5 = | 0010001001000100 | 0000000000010001 | 0010001000000100 | 0000000000010001 |
| SY6 = | 0010010010000100 | 0000000000010001 | 0010000010000100 | 0000000000010001 |
| SY7 = | 0010010001000100 | 0000000000010001 | 0010010000000100 | 0000000000010001 |

(b) STATES 3 AND 4

|  | (MSB) | (LSB) | (MSB) | (LSB) |
|---|---|---|---|---|
| SY0 = | 1001001000000100 | 0000000000010001 | 1001001001000100 | 0000000000010001 |
| SY1 = | 1000010001000100 | 0000000000010001 | 1000010000000100 | 0000000000010001 |
| SY2 = | 1001000001000100 | 0000000000010001 | 1001000000000100 | 0000000000010001 |
| SY3 = | 1000100001000100 | 0000000000010001 | 1000100000000100 | 0000000000010001 |
| SY4 = | 1000010000010100 | 0000000000010001 | 1000010001000100 | 0000000000010001 |
| SY5 = | 1000100001000100 | 0000000000010001 | 1000000100000100 | 0000000000010001 |
| SY6 = | 1001000001000100 | 0000000000010001 | 1000000001000100 | 0000000000010001 |
| SY7 = | 1000100001000100 | 0000000000010001 | 1000100000010100 | 0000000000010001 |

DATA TRANSMITTING METHOD, DATA RECORDING APPARATUS, DATA RECORD MEDIUM AND DATA REPRODUCING APPARATUS

BACKGROUND OF THE INVENTION

1. Field of the Invention

This invention relates to a data transmitting method, a data recording apparatus, a data record medium(recording, recordable or recorded) and a data reproducing apparatus, which may be applied to prevention of duplication or unauthorized use of transmitted or recorded/reproduced digital data.

2. Description of Related Art

Recently, with increased capacity and coming into widespread use of digital recording media, such as optical discs, prohibition of duplication or unauthorized use thereof has become incumbent. That is, digital audio data or digital video data can be duplicated by copying or dubbing without deterioration, while computer data can be duplicated to give data which are the same as the original data, so that troubles are caused due to unauthorized duplication.

For evading unauthorized duplication of digital audio data or digital video data, the standards for so-called serial copying management system (SCMS) or the copying generation management system (CGMS) have so far been known. However, since these standards set a copying inhibiting flag at a specified portion of recording data, data may be extracted by whole copying, that is so-called dump copying, of digital bi-level signals.

There is shown of JP Patent Kokai Publication JP-A-7-182766 (1995) a method consisting in recording non-duplicatable information (confidential information) on a record medium and using this information for prohibiting unauthorized copying. However, this method is not immune from the above problem of data extraction by dump copying.

In particular, the whole copying or dump copying is carried out by a technique of directly extracting digital bi-level signals read out by a reproducing head, such as an optical head, thus causing troubles.

The same may be said of the currently developed digital video disc (DVD), such that, in a replay-only disc that may be duplicated in large quantities, some measures must be taken in connection with formatting.

SUMMARY OF THE INVENTION

It is therefore an object of the present invention to provide a data transmitting method, a data recording apparatus, a data record(recording, recordable or recording) medium and a data reproducing apparatus, whereby digital bi-level signals may be prohibited from being copied directly for prohibiting unauthorized duplication, such as preparation of pirate editions.

According to the present invention, a reproduction obstructing area obstructing the reproducing operation is provided in a signal to be transmitted or recorded, and the position designation information designating the arraying position of the reproduction obstructing area is transmitted or recorded along with data.

The reproduction obstructing area may be an area having a special synchronization signal different from the synchronization signal conforming to the standard. The special synchronization signal may be different in transition length from the synchronization signal conforming to the standard. The reproduction obstructing area may be an area in which are formed pits or grooves having lengths causing servo disengagement.

If the transmitted or recorded signals are directly copied, clock synchronization or servo becomes disengaged due to the reproduction obstructing area, thus prohibiting whole copying.

BRIEF DESCRIPTION OF THE DRAWINGS

FIG. 4 illustrates an example of a synchronization word appended to a modulation signal.

FIG. 15 shows another example of a synchronization word appended to a modulated signal.

DESCRIPTION OF THE PREFERRED EMBODIMENTS

Figure 1:
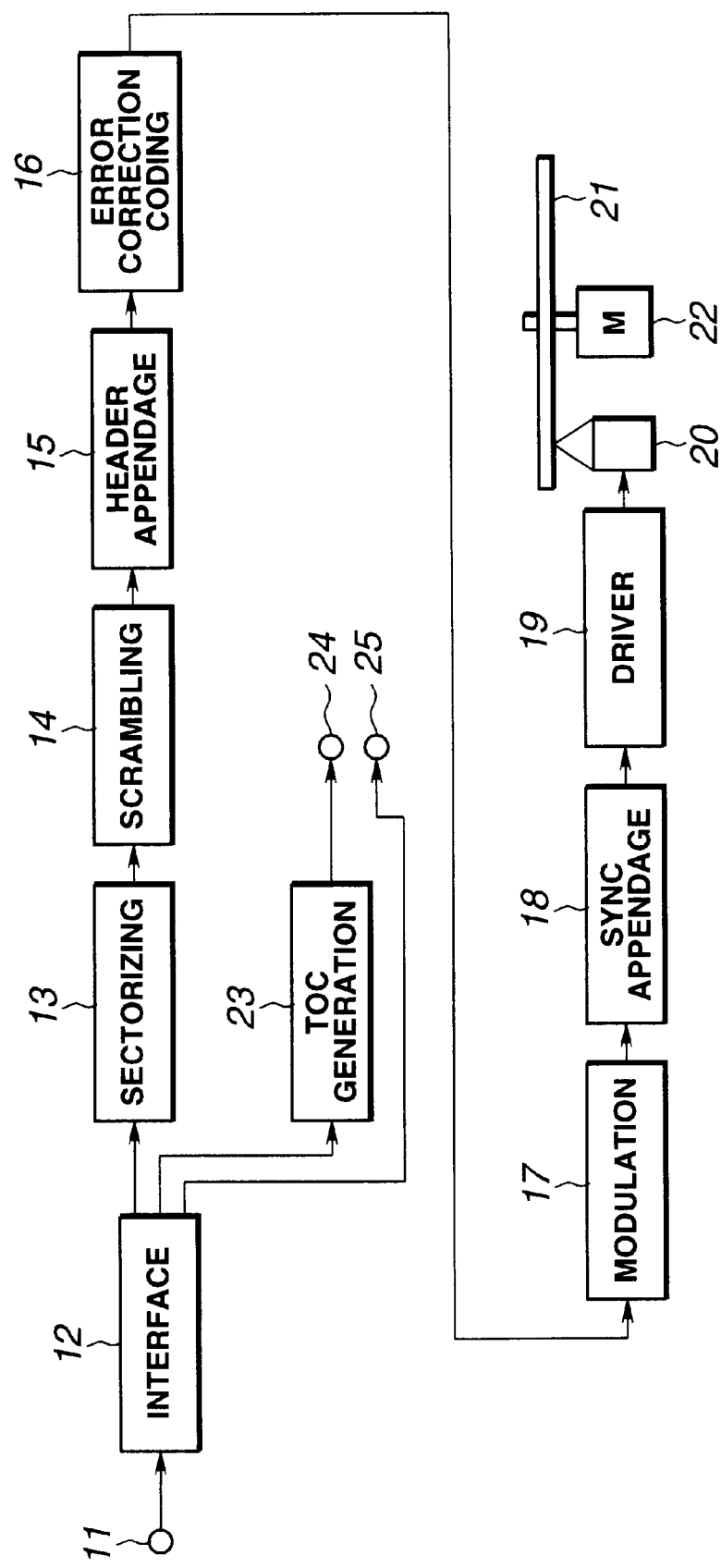
FIG. 1 is a schematic block diagram showing a data recording apparatus embodying the present invention.

Referring to the drawings, preferred embodiments of the present invention will be explained in detail.

FIG. 1 is a schematic block diagram showing a data recording apparatus embodying the present invention.

Referring to FIG. 1, digital data, such as data converted from analog audio signals or video signals by A/D conversion, or computer data, are supplied to an input terminal 11. The input digital data is sent via an interfacing circuit 12 to a sector forming circuit 13 so as to be formed into sectors each made up of 2048 bytes as a unit. The data formed into sectors are sent to a scrambling circuit 14 for scrambling. The scrambling herein means randomization of input data for preventing the same byte pattern from appearing continuously, that is for removing the same pattern, for enabling proper signal reading and writing. The scrambled or randomized data is sent to a header appendage circuit 15 where header data is appended to a leading end of each sector. The resulting data is sent to an error correction encoding circuit 16. The error correction appendage circuit 16 performs data delay and parity calculations for appending parity data. A modulation circuit 17 of the next stage converts 8-bit data, for example, into 16 channel bit modulated data in accordance with a pre-set modulation rule and sends the resulting modulated data to a synchronization appendage circuit 18. The synchronization, appendage circuit 18 appends synchronization signals of a so-called out-of-rule pattern in terms of a pre-set data volume as a unit and sends the resulting data via a driving circuit, that is a driver 19, to a recording head 20. The recording head 20 effects optical or photo-magnetic recording and records the modulated recording signals on a disc-shaped record (recording, recordable or recorded) medium 21. This disc-shaped record medium 21 is run in rotation by a spindle motor 22.

The scrambling circuit 14 may also be inserted downstream of the header appendage circuit 15 for scrambling the digital data with the header appended thereto and for sending the scrambled data to the error correction coding circuit 16.

An illustrative structure of various components of the arrangement of FIG. 1, as a first embodiment of the present invention, is now explained.

Figure 2:
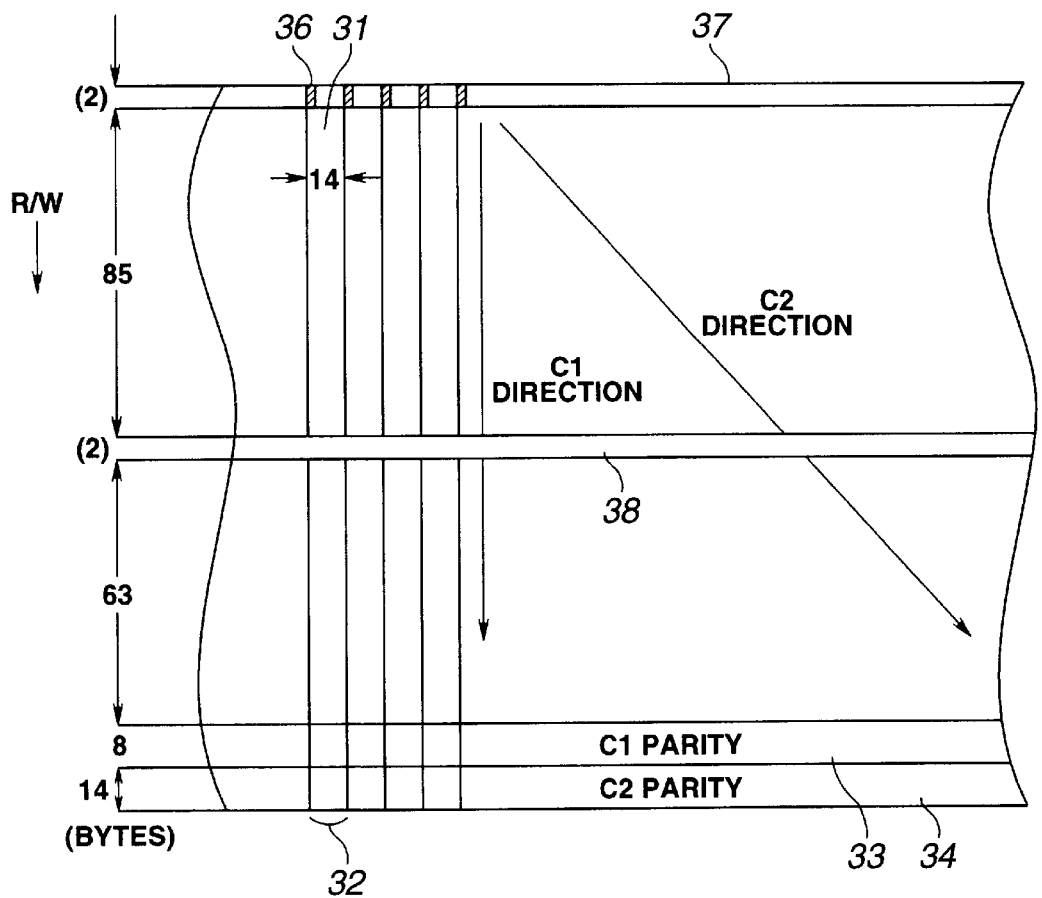
FIG. 2 illustrates an example of error correction coding.

FIG. 2 shows an illustrative format of a signal after appendage of the synchronization signals by the synchronization appendage circuit 18.

Figure 3:
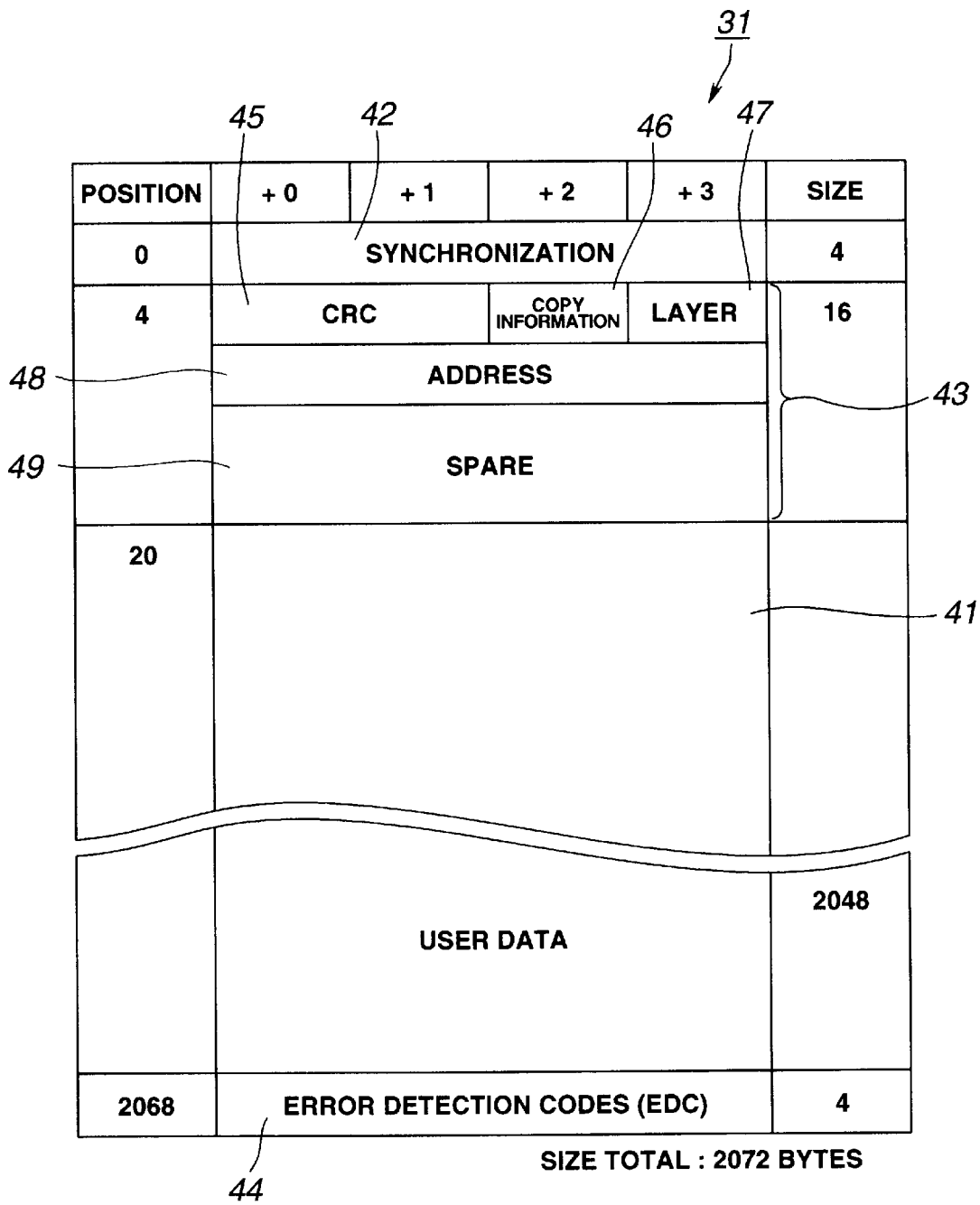
FIG. 3 illustrates an example of sector formatting.

Referring to FIG. 2, 148 bytes of information data are arrayed in the read/write direction (R/W direction). 14 columns each composed of 148 bytes make up one-sector information data 31 of 2072 bytes. The one-sector information data 31 of 2072 bytes are arranged as shown for example in FIG. 3, in which one sector is made up of a 2048 byte user data area 41, a 4-byte synchronization area 42, a 16-byte header area 43 and a 4-byte error detection code (EDC) area 44. The error detection code of the error detection code area 44 is made up of a 32 bit or 4-byte CRC code generated for the user data area 41 and the header area 43. Within the header area 43 are provided a CRC 45 as a cyclic code, copy data 46 for copy permit/not permit or copy generation management, a layer 47 specifying one of layers of a multi-layer disc, an address area 48 and a spare area 49.

The one-sector 2072 byte information data 31 is arrayed two-dimensionally in vertical 148 (=85 63) bytes as and in 14 horizontal columns, as shown in FIG. 2. The C1 direction for error correction coding is taken in the vertical R/W direction and 8-byte C1 parity data 33 is generated and appended, while the C2 direction for error correction coding is taken in the oblique direction and 14-byte C2 parity data 34 is generated and appended. Each sector 32, inclusive of the C1 parity 33 and C2 parity 34, is made up of 2380 bytes. The data made up of the information data and parity data is modulated by the modulation circuit 17 in accordance with a pre-set modulation system so that one byte (8 bits) is converted into, for example, 16 channel bit modulated data. To this modulated data is appended a synchronization signal of a pattern of 2 bytes or 32 channel bits in the synchronization appendage circuit 18. As this synchronization signal, a sector sync 36 is arrayed at the leading end of the sector, and a C1 sync 37 is arrayed at the leading end in the vertical direction except the sector sync 36. An additional sync 38 is arrayed at a mid position dividing the 170 bytes in the vertical direction into two 85-byte portions. A vertical column of the structure of FIG. 2 is termed a C1 frame within which there are provided two synchronization signals.

FIG. 4 shows illustrative patterns of the synchronization signals. Thus, FIG. 4 shows three sorts of synchronization words S0 to S2. These synchronization words are of a so-called out-of-rule signal pattern violating the modulation rule for the modulation circuit 17. Specifically, 11T, T being a channel bit period, appears twice on end as a signal transition or reversion length. This pattern is not used in a data modulation pattern for the modulation circuit 17, so that data and synchronization words can be reliably isolated from each other. These synchronization words S2 to S0 can be associated respectively with the syncs 36 to 38 of FIG. 2. Specifically, the synchronization words S2, S1 and S0 are used for the sector sync 36, C1 sync 37 and for the additional sync 38, respectively.

In the embodiment of the present invention, the synchronization format different from the above standardized synchronization format and which is usually not used is used for at least certain areas or sectors so that synchronization becomes disengaged for normal reproduction for prohibiting so-called dump copying, that is direct copying of the bi-level digital data as discussed above. Such area is generally termed a playback obstructing area.

Examples of using such synchronization format, not usually used, include using a special pattern, different from the standardized synchronization signal pattern as shown in FIG. 4, and arraying the synchronization signal at an irregular position different from the regular position for the synchronization signal prescribed in the standardization format.

A first example of using a special synchronization pattern is using a transition length longer than the above interval 11T, for example, 12T or 13T. It is possible to use not only a pattern including two repetitions of 12T or 13T, but a pattern consisting in the combination of mutually different transition lengths inclusive of 12T or 13T. For example, a pattern including two repetitions of the transition length of 13T, such as 0000 0100 0000 0000 0010 0000 0000 0001 may be used as the synchronization signal for the 32 channel bit synchronization signal. This gives rise to synchronization disengagement during dump copying, A second example of using a special synchronization pattern includes using a transition length shorter than the smallest transition length of 3T provided in the modulation rule for the modulation circuit 17, such as 1T or 2T. That is, repetition of 1T or 2T is formed by pits smaller than the physically existing pits. Of course, junction conditions may be met ahead and at back of the synchronization patterns. An example of repetitions of 2T representing the synchronization signal for 32 channel bits is 0101 0101 0101 0101 0101 0101 0101 0101.

If the synchronization signals with shorter transition length is used, there is produced such an effect that, if the data is reproduced unawares, the RF signal level is progressively lowered to render reproduction difficult.

A third example of using a special synchronization pattern includes using a repetition of the transition interval 11T but arraying the repetition at a position different from the position of the transition interval of 11T in the standardized synchronization pattern, that is arraying the repetition with an offset. Typical of this pattern is 0000 0100 0000 000 1000 0000 0001 0001.

A fourth example of using a special synchronization pattern is using a modulated signal of actual data as a synchronization signal instead of using an out-of-rule pattern violating the modulation rule for the modulation circuit 17. For example, a 32 channel bit signal, obtained on modulation of 16-bit data in hexadecimal notation "00FFh", is used as a synchronization signal.

If such special synchronization pattern is used in at least a certain area, such as a pre-set sector, this area or sector represents the above-mentioned reproduction obstructing area, and the position designation data for designating the sector address of the reproduction obstructing area is recorded simultaneously. That is, during signal recording, the position designating data is also recorded in association with usual data, while the synchronization appendage circuit 18 of FIG. 1 switches the synchronization signal of the sector of the reproduction obstructing area designated by the position designating data to a synchronization signal of the above-mentioned special synchronization pattern and appends the latter synchronization signal of the special synchronization pattern.

Figure 5:
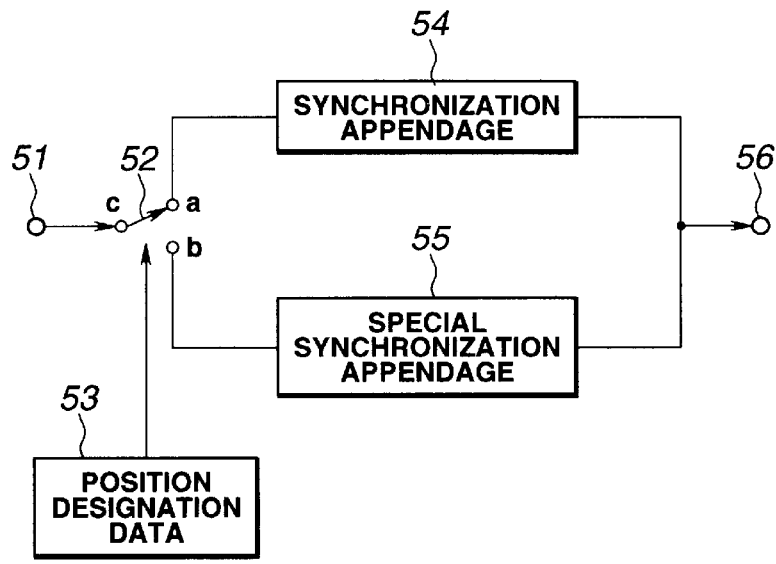
FIG. 5 is a block diagram showing an example of a synchronization appendage circuit.

FIG. 5 shows an example of a synchronization appendage circuit configured for switching the special synchronization pattern responsive to the above-mentioned position designation data. The synchronization appendage circuit of FIG. 5 may be used as the synchronization appendage circuit 18 of FIG. 1. To an input terminal 51 is supplied a modulated signal from the modulation circuit 17.

The signal entering the input terminal 51 is sent to a common contact c of a changeover switch 52, outputs of fixed contacts a and b of which are sent to a synchronization appendage circuit 54 configured for appending the standardized synchronization pattern and to a special synchronization appendage circuit 55 configured for appending the synchronization signal of the special synchronization pattern, respectively. Outputs of the synchronization appendage circuit 54 and the special synchronization appendage circuit 55 are issued at an output terminal 56 and sent to the driver 19 of FIG. 1. The changeover switch 52 is controlled to be set responsive to the position designation data from a position designation data output circuit 53. In the above case, the position designating data for designating the sector address of the reproduction obstructing area may be recorded in a pre-set region, for example, a table-of-contents (TOC)region. That is, the position designating data is provided a table-of-contents(TOC) generating circuit 23 via interface circuit 12 as shown in FIG. 1. The information provided from the TOC generating circuit 23 is provided the recording head 20 via a terminal 24, thereafter, the information is recorded in the TOC region of the record medium.

Instead of using the special synchronization pattern different from the usual synchronization pattern as described above, the relation of correspondence between the three sorts of the synchronization patterns S0 to S2 shown in FIG. 4 and the sector sync 36, C1 sync 37 and the additional sync 38 shown in FIG. 2 may be changed from the regular relation of correspondence conforming to the standard. That is, if the sector sync 36, C1 sync 37 and the additional sync 38 are associated respectively with S2, S1 and S0, respectively, as the regular relation of correspondence, it is possible to deviate from such relation of correspondence so that the synchronization patterns S0, S2 and S1 will be used as synchronization patterns for the sync 36, C1 sync 37 and the additional sync 38, respectively.

Several examples of inserting the synchronization signals in irregular positions different from the positions conforming to the standard will now be explained.

Figure 6A:
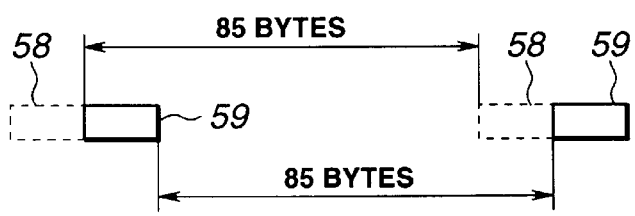
FIGS. 6A and 6B illustrate examples of arraying synchronization signals at other than the regular synchronization signal positions.
Figure 6B:
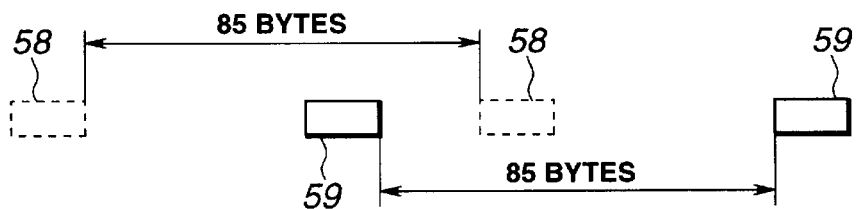

A first example is inserting the synchronization signals at irregular positions 59 different from regular synchronization signal positions 58, and maintaining the interval between these irregular positions 59 at a regular interval, such as 85-byte interval, as shown in FIGS. 6A and 6B. That is, in FIG. 6A, the irregular positions 59 are provided next to the regular positions for the synchronization signals 58, whereas, in FIG. 6B, the irregular positions 59 are provided at optional positions between the regular positions for the synchronization signals 58, and the interval between adjacent irregular positions is maintained at 85 bytes.

A second example of making the synchronization signal position different includes sporadically setting the intervals of the irregular positions of inserting the synchronization signals. In the first example, the interval between the irregular positions 59 is set to a regular interval, such as 85-byte interval. In the second example, this interval is randomized.

A third example of making the synchronization signal position different includes inserting the synchronization signal in a data portion, so that the number of the synchronization signals in each C1 frame, that is in each column in the vertical direction of FIG. 2, will be three or more.

If, in the third example, an increased number of synchronization signals is used in the data portion, it becomes difficult to insert data in the data portion of the sector. However, in the above first and second examples, data can be inserted at other than the irregular positions.

In the above examples, normal synchronization detection or separation is rendered infeasible by using a synchronization format which is different from the synchronization format as provided for by the standard and which is usually not used. As a modification, it is also possible to provide a structure disabling servo or clock operations, such as pits, grooves or mirror surfaces of servo disengaging lengths, in a prescribed region.

For example, it is possible to form pits or grooves having servo disengaging lengths.

Alternatively, it is possible to provide non-recorded regions, such as mirror surfaces, having lengths longer than the servo disengaging lengths.

By providing the regions having such construction, the servo becomes disengaged during reproduction to prohibit direct copying of the digital bi-level signals.

During normal reproduction, proper reproduction of the reproduction obstructing area may be performed by writing the position designating information, such as the position designating data for the reproduction obstructing area, in a pre-set region, for example, a table-of-contents (TOC) region, or by designating the reproduction obstructing area by a pointer provided at a designated position. For example, if the reproduction obstructing area causing servo disengagement is used, the position designating information corresponding to the reproduction obstructing area is recorded in the TOC area, when reproducing, by detecting the position designating information, this area and may not be reproduced by, for example, jumping.

The above-described technique of preventing whole copying of the digital bi-level data as described above may also be combined with data encryption for raising data security.

That is, at least one of the sector forming circuit 13, scrambling circuit 14, header appendage circuit 15, error correction coding circuit 16, modulation circuit 17 and the synchronization appendage circuit 18 may be configured for ciphering an input signals and for outputting the ciphered data. The key information for such encryption uses, at least in part, the identification information written in a region other than the data recording region on the record medium 21, such as the identification information proper to the record medium, the producer identification information, seller identification information, the identification information proper to the recording apparatus or encoder or the identification information supplied from outside. Thus the identification information written in other than the data recording region of the record medium may, for example, the information sent from the interfacing circuit 12 to a terminal 24 via a table-of-contents (TOC) generating circuit 23, or the information directly sent from the interfacing circuit 12 to a terminal 25. The key information from the terminals 24, 25 is used as part of the key information for encryption. The input data is ciphered, using the key information, in at least one and desirably two or more of the circuits 13 to 18.

Which of the circuits 13 to 18 has done the encryption also represents one of alternatives and is thought to be the key required for producing the regular reproduction signal during reproduction. That is, if encryption is done in one of the circuits, it becomes necessary to select one of six alternatives, whereas, if encryption is done in two of the six circuits, it becomes necessary to select one of thirty alternatives. If there is a possibility of performing the encryption at one to six of the six circuits 13 to 18, the number of alternatives is increased further, such that it becomes difficult to find the combinations by a trial-and error method. Thus the purpose of encryption can be met satisfactorily.

The key information for encryption may be switched at a pre-set timing, such as in a sector period, for further raising the level of encryption or deciphering difficulty.

At least a portion of the key information for encryption may be recorded in a region or sector where the synchronization format not used normally is used. The result is that, even although synchronization disengagement can be evaded if this region or sector is known, synchronization disengagement is produced in case the digital bi-level signals are directly copied, so that the key information cannot be reproduced.

Although the foregoing description has been made of recording on a record medium, the above-described technique can be easily applied to processing and transmission of input digital data in general. This can be realized by providing the above-mentioned reproduction obstructing area in transmission data signals in general.

Figure 7:
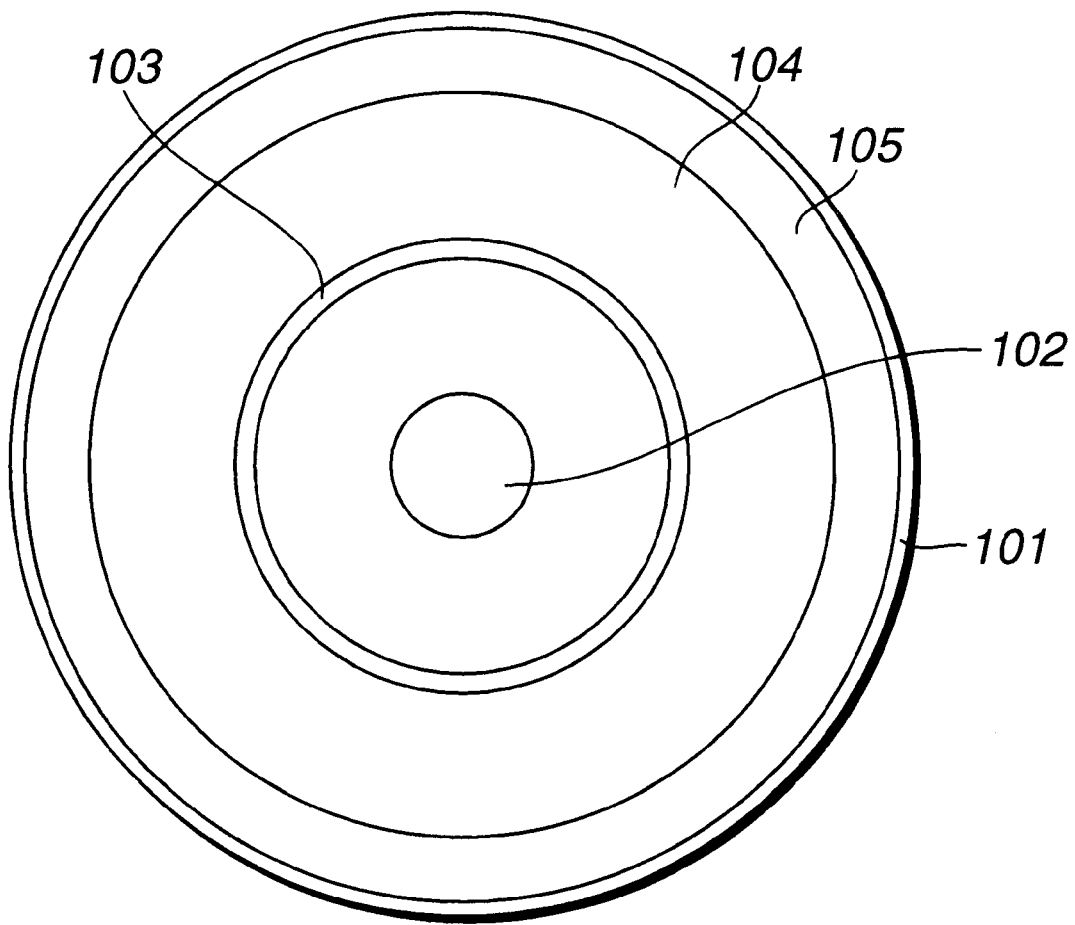
FIG. 7 illustrates an example of a data record medium.

FIG. 7 shows a disc-shaped record medium, such as an optical disc, as an example of a record medium. The disc-shaped record medium 101 has a center aperture 102. Looking from the inner rim towards the outer rim of the disc-shaped record medium 101, there are formed a lead-in area 103, as a program management region or TOC region, a program area 104 having program data recorded therein, and a program end area, or a so-called lead-out area 105. In an optical disc for reproducing audio or video signals, the audio or video signals are recorded in the program area 104, while the time information or the like for the audio or video data is managed by the lead-in area 103.

The identification information or the like, written in areas other than the program area 104, as the data recording area, may also be used as part of the key information. Specifically, the identification information, such as the production number proper to a particular record medium, producer identification number, seller identification number, identification information proper to a particular recording apparatus or a particular encoder, or the identification information proper to a particular device for producing the recording media, such as a cutting machine or a stamper, is recorded in the lead-in area 103, as the TOC region, and in the lead-out area 105. In addition, a signal obtained on encryption in at least one and desirably two or more of the above-mentioned six circuits 13 to 18, using the above information as the key information, is recorded in the program area 104 as the data recording area. During reproduction, the above identification information may be used as the key information for deciphering. The identification information may be written physically or chemically in an area radially inwardly of the lead-in area 103 and read out during reproduction so as to be used as the key information for deciphering.

The position designation information may also be recorded in a pre-set area, such as the TOC region of the lead-in area 103. In this case, the reproduction obstructing area may be directly designated by the position designation information of the TOC region. Alternatively, the position designation information in the TOC region may simply designate a pointer in data and this pointer in turn may designate the position in the reproduction obstructing area.

Figure 8:
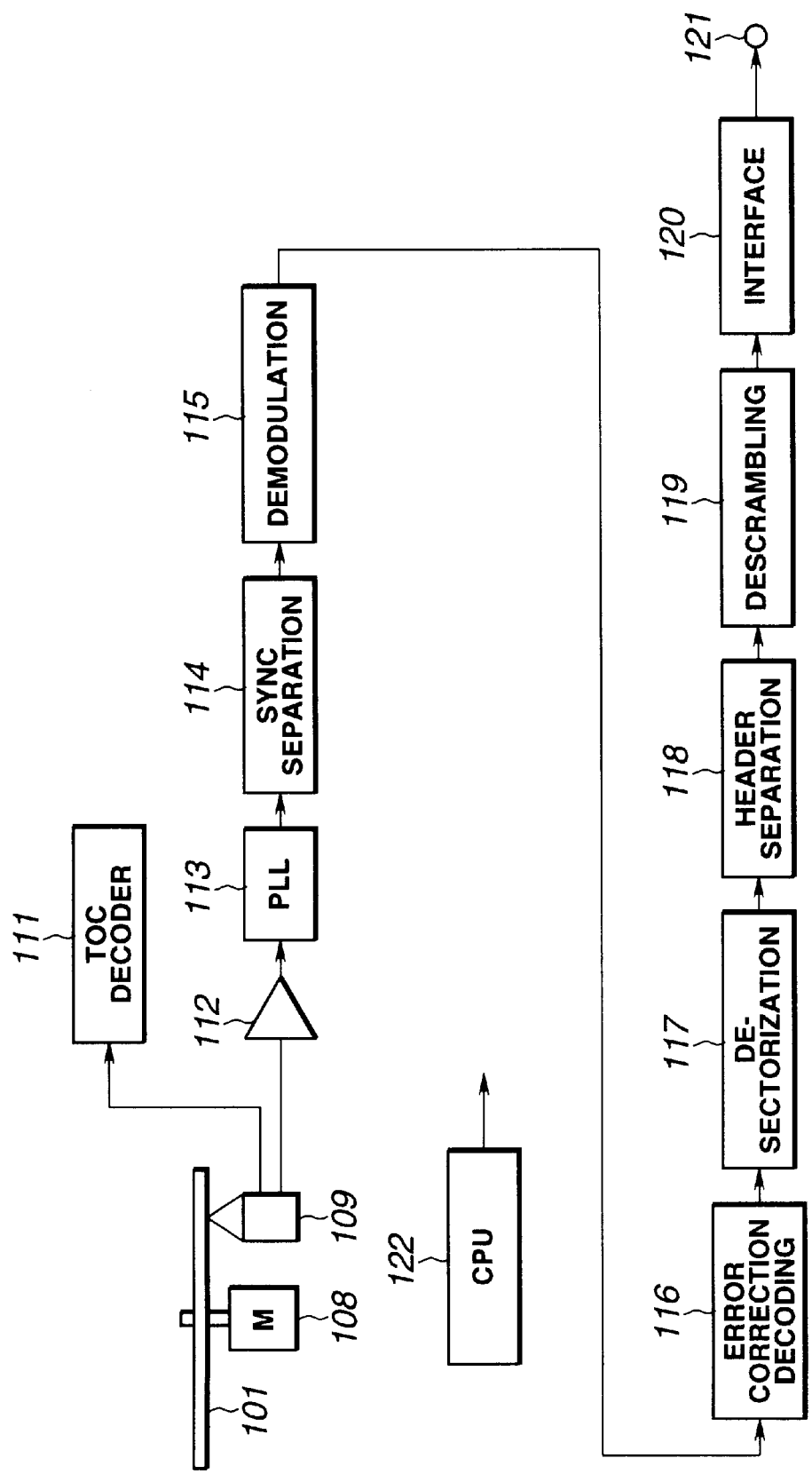
FIG. 8 is a schematic block diagram showing the structure of a data reproducing apparatus embodying the present invention.

Referring to FIG. 8, a data reproducing apparatus for carrying out the data reproducing method of the present invention will now be explained.

Referring to FIG. 8, a disc-shaped record medium 101, as a record medium, is run in rotation by a spindle motor 108, so as to have its recording contents read out by a reproducing head device 109, such as an optical pickup. The above-mentioned whole copying of the digital bi-level signals means such duplication in which signals from the reproducing head device 109 are directly extracted and recorded on another record medium.

The digital signals, read out by the reproducing head device 109, are sent to a TOC decoder 111 and an amplifier 112. From the TOC decoder 111, the above identification information recorded as a portion of the TOC information in the lead-in area 103 of the disc-shaped record medium 101, such as the production number proper to a particular record medium, producer identification number, seller identification number, identification information proper to a particular recording apparatus or a particular encoder, or the identification information proper to a particular device for producing the recording media, such as a cutting machine or a stamper, is read out so as to be used as at least a portion of the key information used for deciphering. It is also possible to output the identification information proper to the reproducing apparatus or the identification information supplied from outside from the CPU 122 within the reproducing apparatus and to use the identification information as at least a portion of the key information. Examples of the identification information from outside include the identification information received over the communication network or the transmission channel and the identification information obtained on reading an IC-card, ROM card, magnetic card or an optical card.

The digital signal taken out from the reproducing head device 109 via an amplifier 112 and a phase-locked loop (PLL) 113 is sent to a synchronization separation circuit 114 for separating the synchronization signal appended in the synchronization signal appendage circuit 18 of FIG. 1. The digital signal from the synchronization separation circuit 114 is sent to a demodulation circuit 115 for carrying out demodulation which is a reverse operation of modulation by the modulation circuit 17 shown in FIG. 1. The digital data from the demodulation circuit 115 is sent to an error correction decoding circuit 116 for carrying out decoding which is a reverse operation of encoding by the error correction encoding circuit 16 of FIG. 1. The data from the error correction decoding circuit 116 is resolved into sectors by a sector resolution circuit 117 and the header at the leading end of each sector is separated by a header separation circuit 118. The sector resolution circuit 117 and the header separation circuit 118 are counterpart devices of the sector firming circuit 13 and the header appendage circuit 15 of FIG. 1, respectively. The data from the header separation circuit 118 is processed by a descrambling circuit 119 with descrambling which is a reverse operation of scrambling by the scrambling circuit 14 of FIG. 1. The reproduced data is outputted via interfacing circuit 120 at an output terminal 121.

Figure 9:
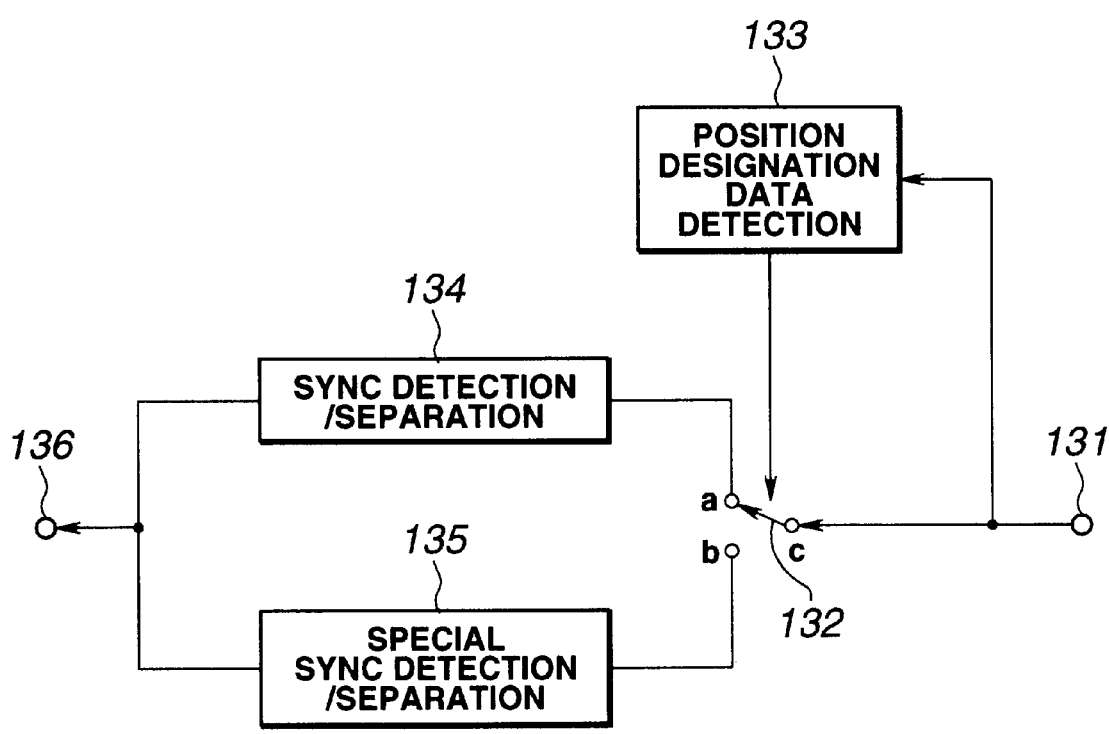
FIG. 9 is a block diagram showing an example of a synchronization separation circuit.

Since the reproduction obstructing area is recorded on the record medium as described previously, it is necessary to provide processing measures for prohibiting adverse effects otherwise caused by directly reproducing the reproduction obstructing area. These processing measures differ with the type of the reproduction obstruction area. For example, if a special synchronization pattern is used, the special synchronization patterns may be switched in a controlled manner as shown in FIG. 9. If the synchronization signal position different from the regular position is used, synchronization detection may be performed at the different position or omitted for the area. On the other hand, if servo disengagement is used, the reproduction in the area may be inhibited.

FIG. 9 shows an illustrative structure of a synchronization separation circuit on the reproducing side in case the synchronization signal of a special synchronization pattern is appended at a synchronization signal position of a pre-set area or sector during recording as explained in connection with FIG. 5. The synchronization separation circuit shown in FIG. 9 may be used as the synchronization separation circuit 114 of FIG. 8. An output signal of the PLL circuit 113 of FIG. 8 is supplied to an input terminal 131.

An input signal at an input terminal 131 of FIG. 9 is supplied to a common contact c of a changeover switch 132. Outputs of fixed contacts a and b of the changeover switch 132 are sent to a synchronization detection/separation circuit 134 configured for detecting and separating the synchronization signal of the synchronization pattern conforming to the standard and to a special synchronization detection/separation circuit 135 configured for detecting and separating synchronization signals of the special synchronization pattern, as described above, respectively. Outputs of the synchronization detection/separation circuit 134 and the special synchronization detection/separation circuit 135 are issued at an output terminal 136 so as to be supplied to the demodulation circuit 115 of FIG. 8.

The input signal at the input terminal 131 is also sent to a position designation data detection circuit 133 where the position designation data specifying the reproduction obstructing area provided with the synchronization signal of the special synchronization pattern is detected and taken out. The changeover switch 132 is controlled responsive to the position designation data from the position designation data detection circuit 133. As mentioned above, the position designation data may also be written in the TOC information in the lead-in area 103 of FIG. 7. In such case, the position designation data may be obtained from the TOC decoder 111 of FIG. 8. Alternatively, the position where the position designation data is arrayed may be designated by the information provided in the TOC area.

FIG. 9 shows an illustrative arrangement of a synchronization separation circuit on the reproducing side for the case wherein a special pattern synchronization signal is used for the synchronization signal of a pre-set area or sector to provide a reproduction obstructing area. Of course, for other types of the reproduction obstructing area, suitable reproduction measures are required to cope with the particular reproduction obstructing area types. For example, if the synchronization signal position differs from the regular synchronization signal position, the synchronization detection position may be controlled for enabling synchronization detection for doing synchronization detection at the different position or not doing synchronization detection in the reproduction obstructing area. If pits, grooves or mirror surfaces which will cause servo disengagement are provided in the reproduction obstructing area, the reproduction obstructing area may be recognized as the reproduction inhibiting area so that signal reproduction will be avoided by e.g., track jump.

If encryption processing is done at least in one of the sector forming circuit 13, scrambling circuit 14, header appendage circuit 15, error correction coding circuit 16, modulation circuit 17 and the synchronization appendage circuit 18, inclusive of the error correction circuit 16, it becomes necessary to perform deciphering in the reproducing circuits 114 to 119 associated with the circuit(s) where encryption processing is done. That is, if encryption is done in the sector forming circuit 13, deciphering becomes necessary to perform in the sector resolution circuit 13 of FIG. 1 using the key information for encryption. Similarly, deciphering by the descrambling circuit 119 and by the header separation circuit 118 become necessary to perform in association with the encryption by the scrambling circuit 14 and that by the header appendage circuit 15 of FIG. 1, respectively. The encryption by the error correction encoding circuit 16 of FIG. 1 is necessarily performed and correspondingly the deciphering by the error correction decoding circuit 116 is required. In addition, if encryption is done in the modulation circuit 17 or in the synchronization appendage circuit 18 of FIG. 1, deciphering becomes necessary to perform in the demodulation circuit 115 and in the synchronization separation circuit 114, respectively.

By recording the key information for ciphering directly after the reproduction obstructing area or directly after the synchronization signal of the special synchronization pattern, synchronization or servo becomes disturbed during whole copying of digital bi-level signals for disabling regular reproduction of the key information, thus assuring protection of the key information.

The second embodiment of the present invention is now explained. The basic structure of the present second embodiment is similar to that of FIG. 1, however, the circuits 13 to 18 or the signal format of FIG. 1 are slightly modified from those of FIG. 1. The following description is made on these different portions.

Figure 10:
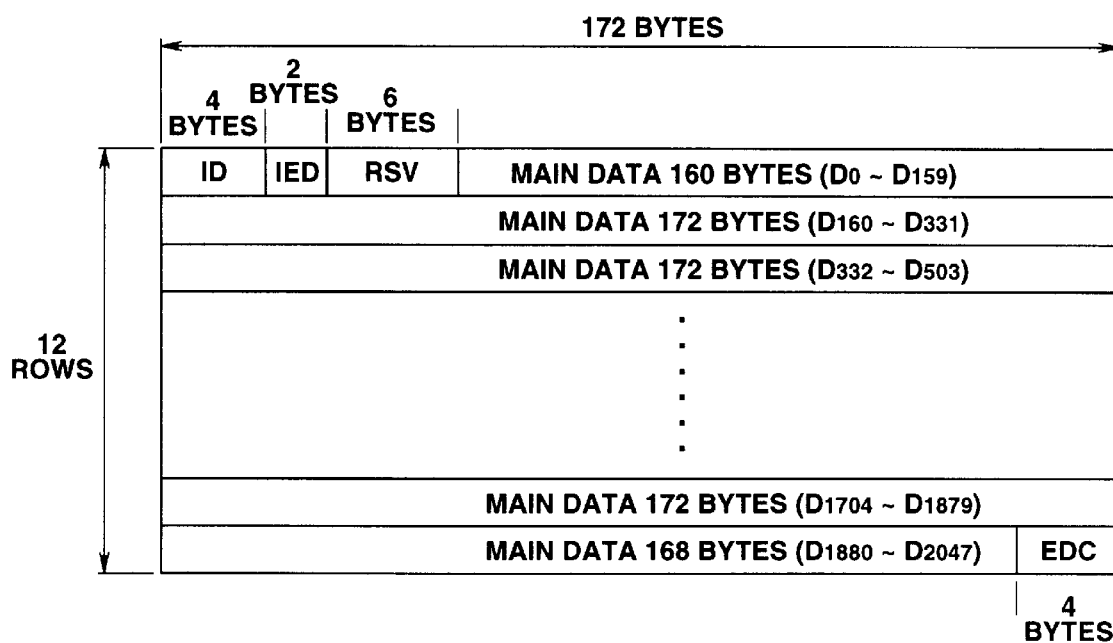
FIG. 10 shows another example of a sector format.

FIG. 10 shows an example of a sector format of the second embodiment as a format of a signal obtained on appending the synchronization signal by the synchronization appendage circuit 18 of FIG. 1.

Referring to FIG. 10, each sector is made up of 212 rows each consisting of 172 bytes, totalling 1064 bytes, of which 2048 bytes represent main data. At the leading positions of the first one of the 12 rows are arrayed 4-byte identification (ID) data, 2-byte identification error detection (IED) code and 6 bytes of reserve data (RSV) in this order. At the end position of the last row are arrayed 4 bytes of error detection codes (EDC).

Figure 11:
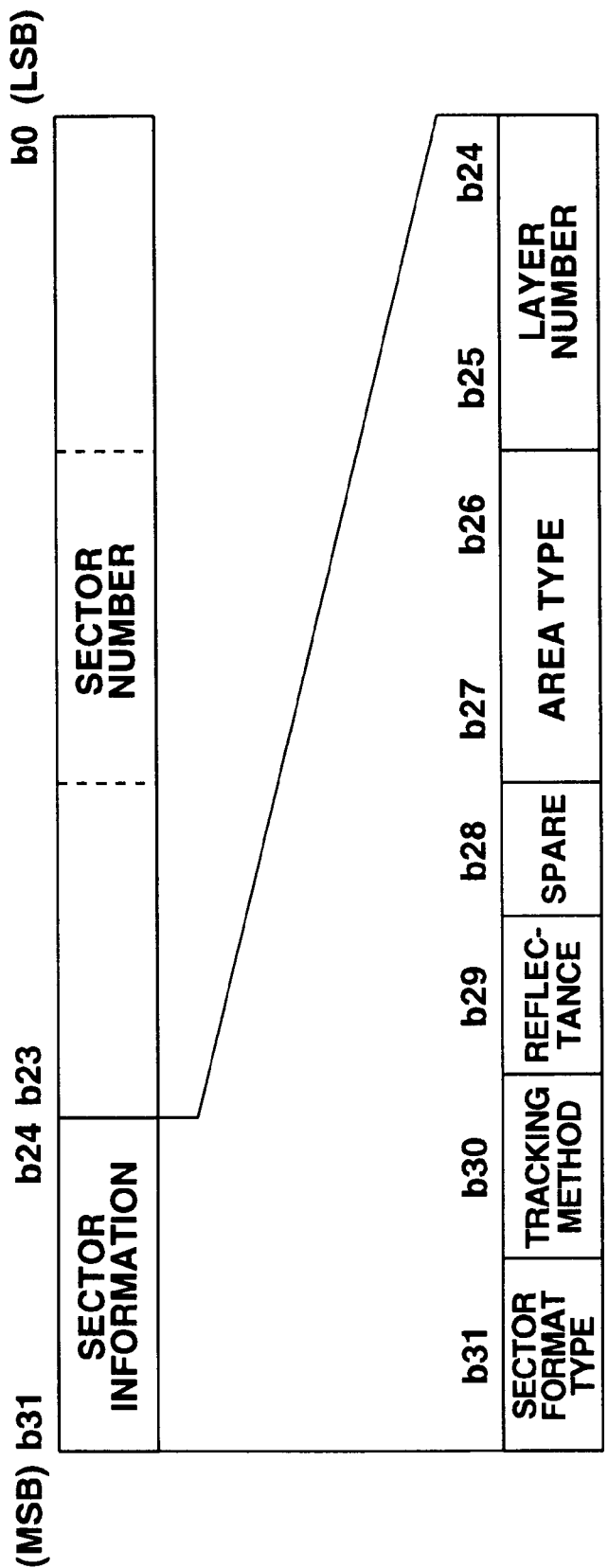
FIG. 11 shows an example of a header area in a sector in the sector format of FIG. 23.

Of the four bytes of the identification (ID) data, the first MSB side byte (bits b31 to b24) represent the sector information, with the remaining three bytes (bits b23 to b0) being sector numbers, as shown in FIG. 11. The sector information is comprised of a 1-bit sector format type, 1-bit tracking method, 1 bit reflectance, 1-bit spare, 2-bit area type and 2-bit layer numbers, looking from the MSB side.

In the above sector format, the header appendage circuit 15 of FIG. 1 can perform transposition, that is bit-based scrambling, on the 24 bits of the sector number of the identification (ID) data responsive to the key information, by way of encryption. In addition, the generating polynominal of the 2-byte identification error detection (IED) code or the generating polynominal of the 4-byte error detection code (EDC) can be modified responsive to the key information by way of encryption.

Figure 12:
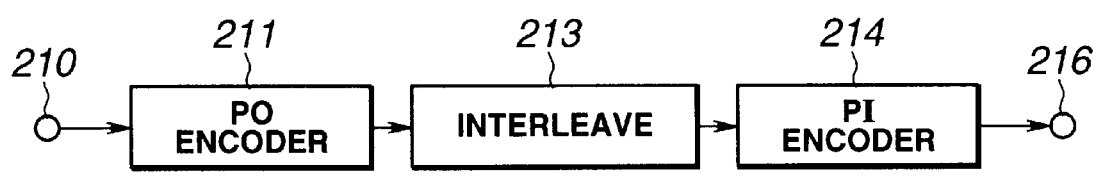
FIG. 12 is a block diagram showing another example of an error correction code.
Figure 13:
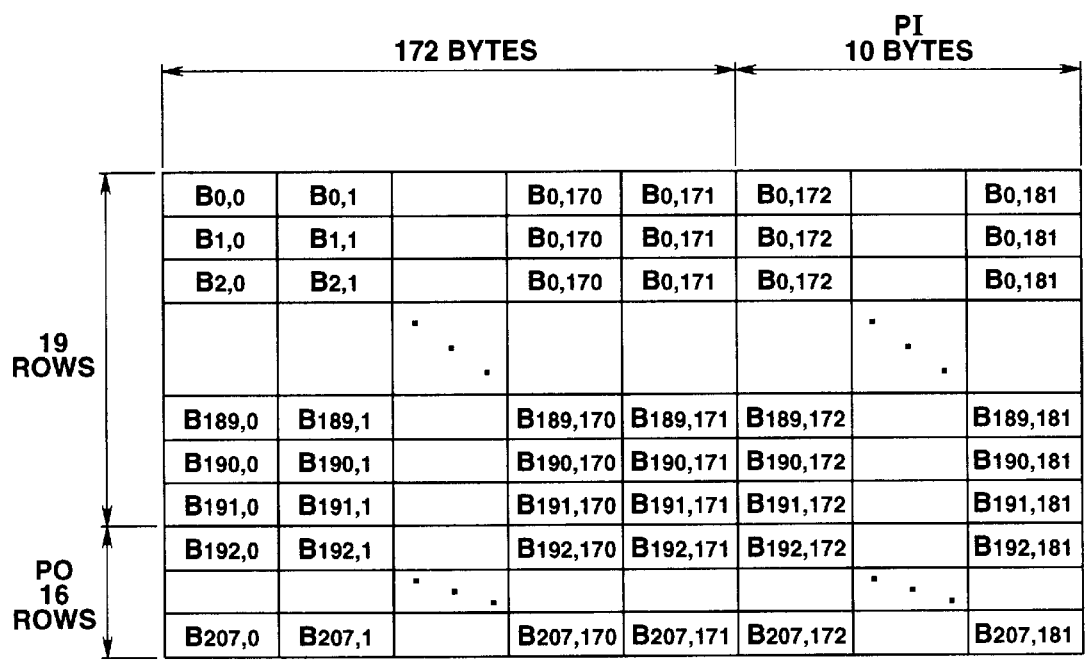
FIG. 13 shows a product code as an illustrative example of an error correction code.

The error correction encoding circuit 16 of FIG. 1 may be configured as shown in FIG. 12. For encoding, product codes or block codes as shown in FIG. 13 are used.

Referring to FIG. 12, data from the header appendage circuit 15 shown in FIG. 1 is supplied to an input terminal 210 of FIG. 1. The input data is supplied to a PO encoder 211 which is a first encoder. The input data to the PO encoder 211 is data of 172 bytes ($B_{0,0}$ to $B_{191,171}$) 192 rows. The PO encoder appends an outer code (PO) of RS (208,192,17) as 16 bytes of the Reed-Solomon (RS) code to data of 172 rows each made up of 192 bytes. Output data of the PO encoder 211 is sent to an interleaving circuit 213 and the resulting interleaved data is sent to a PI encoder 214. The PI encoder 214 appends 10 bytes each of the inner code (PI) of the RS(182,172,11) to 172 bytes of each of 208 rows of data, as shown in FIG. 13. Thus the PI encoder 214 outputs data of 182 bytes 208 rows. The output data is taken out at an output terminal 216.

Figure 14:
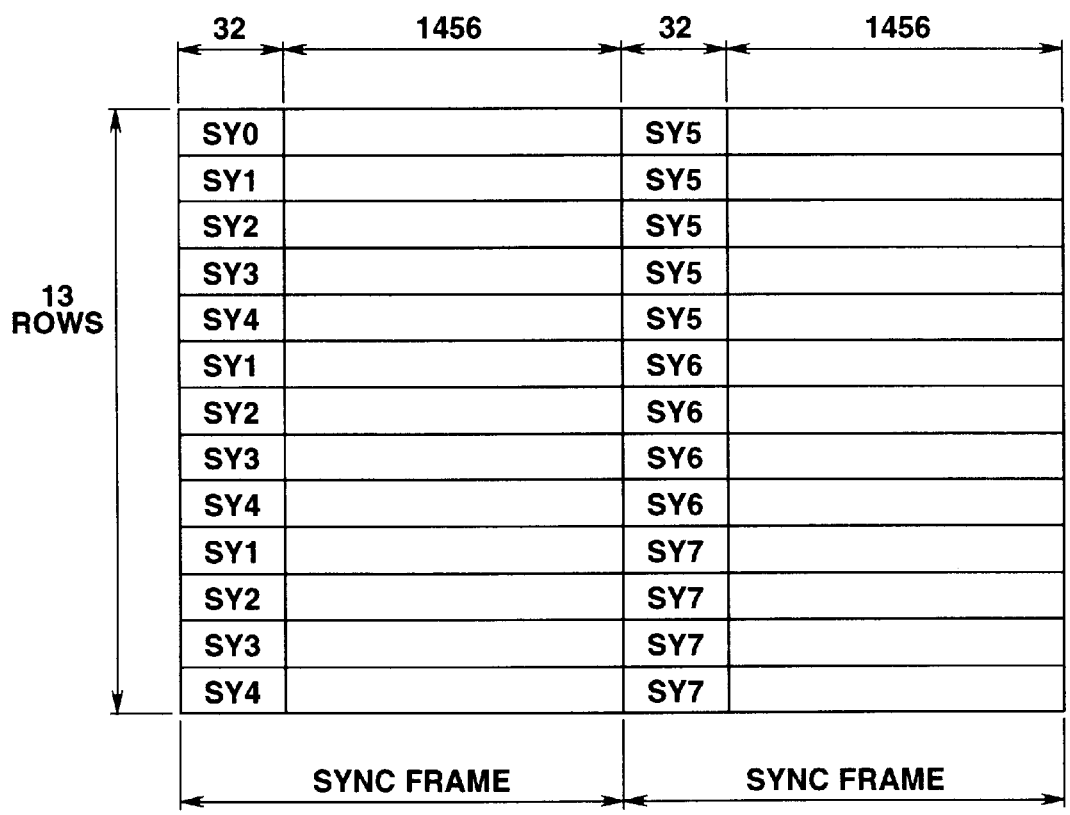
FIG. 14 shows an example of a sector signal format.

The error-corrected and encoded data of 182 bytes 208 rows is interleaved as to rows and divided into 16 groups of 13 rows. These 16 groups are associated with the recording sectors. Each sector is made up of 182 bytes 13 rows, totalling at 2366 bytes. The data is modulated and two synchronization codes SY are appended per row as shown in FIG. 14. For modulation, 8-16 modulation is used as in the first embodiment described above. Each row is divided into two sync frames each of which is made up of a 32-channel bit synchronization code SY and 1456 channel bit data. FIG. 14 shows one sector obtained on modulation and synchronization appendage. The 38688 channel bits for one sector, shown in FIG. 14, corresponds to 2418 bytes prior to modulation. In the modulated output signal of FIG. 14, eight sorts of the synchronization codes SY0 to SY7 are used. Depending on the states of 8-16 conversion, these synchronization codes SY0 to SY7 are of a synchronization pattern shown in FIG. 15A for states 1 and 2 and of a synchronization pattern shown in FIG. 15B for states 3 and 4.

Figure 16:
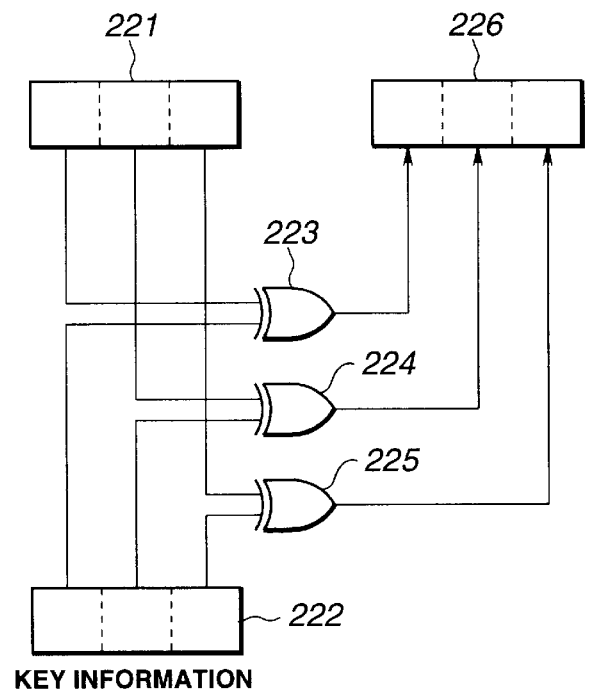
FIG. 16 illustrates another example of encryption in a synchronization appendage circuit.

Selection of these eight sorts of the synchronization codes SY0 to SY7 may be changed responsive to the 3-bit key information for encryption, using the circuit shown for example in FIG. 16. The respective bits of three-bit data 221 specifying the eight sorts of the synchronization codes SY0 to SY7 and the respective bits of the 3-bit key information 222 are Ex-ORed by three ExOR gates 223, 224, 225 to give new synchronization code designation data 226. This modifies the manner of using the synchronization codes in the above frame structure or the positions of using the synchronization codes of various sorts in the frame structure by way of encryption. Of course, the 3-bit data may be transposed, substituted or transformed by a shift register responsive to the key information. Function transformation may also be used.

It is also possible to use a special pattern different from the synchronization pattern shown in FIG. 15. Examples of using such special pattern include using a synchronization pattern of a transition length longer than the maximum transition interval of the modulated signals, a synchronization pattern shorter than the minimum transition length, a pattern different in the transition position from the synchronization pattern or modulated data of pre-set actual signals as a synchronization pattern. The synchronization appendage circuit for switching the special synchronization pattern responsive to the position designation data may be configured as shown in FIG. 5.

Several examples of inserting the synchronization signals in irregular positions different from the regular position conforming to the standard will now be explained.

Figure 17A:
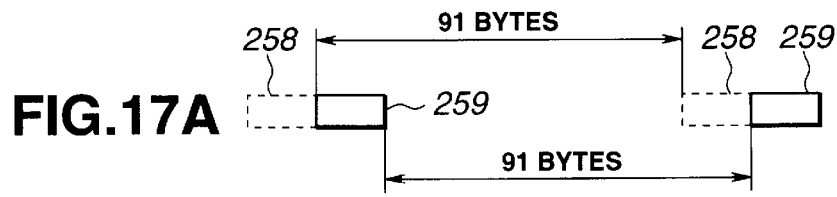
FIGS. 17A and 17B illustrate another example of arraying the synchronization signal at other than the regular synchronization signal position.
Figure 17B:
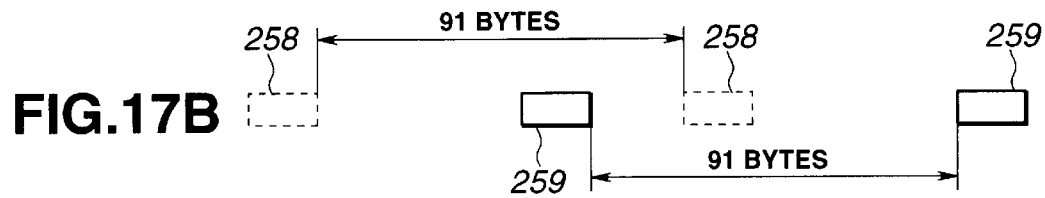

A first example is shown in FIGS. 17A and 17B. It is similar to the example of FIGS. 6A and 6B except the synchronization signal arraying interval.

In the first example, shown in FIG. 17, the synchronization signal is arrayed at an irregular position 259 different from a regular signal position 258, and the interval between the irregular positions 259 is maintained at a regular interval of, for example, 91 bytes, or 1456 channel bits. That is, in the example of FIG. 17A, the irregular position 259 is provided directly after the regular synchronization signal position 258. In the example of FIG. 17B, an arbitrary position between two regular positions 258 is used as a position for the irregular position 259 and the interval between such irregular positions 259 is maintained at 91 bytes.

A second example of making the synchronization signal position different includes sporadically setting the intervals of the irregular positions of inserting the synchronization signals. In the first example, the interval between the irregular positions 59 is set to a regular interval, such as 91-byte interval. In the second example, this interval is randomized.

A third example of making the synchronization signal position different includes inserting the synchronization signal in a data portion, so that the number of the synchronization signals in two sync frames, that is in each row in the horizontal direction of FIG. 14, will be three or more.

If, in the third example, an increased number of synchronization signals is used in the data portion, it becomes difficult to insert data in the data portion of the sector. However, in the above first and second examples, data can be inserted at other than the irregular positions.

It is also possible to provide a structure disabling servo or clock synchronization in a pre-set area, such as pits, grooves or mirror surfaces of servo disengaging lengths, as in the first embodiment described above.

During normal reproduction, proper reproduction of the reproduction inhibiting area may be performed by writing the position designating data for the reproduction obstructing area in a pre-set region, for example, a table-of-contents (TOC) region, or by designating the reproduction inhibiting area by a pointer provided at a designated position, as in the first embodiment described above.

The effect of the second embodiment described above is similar to that described in connection with the first embodiment.

The present invention is not limited to the above-described illustrative embodiments. For example, the present invention is applicable not only to recording/reproduction on or from a record medium, but also to transmission of digital signals in general. Various encryption techniques, such as data substitution, transposition or transformation by a shift register or by various function processing, may also be employed alone or in combination.

We claim:

1. A data transmission method for processing input digital data and transmitting the processed digital data in accordance with a pre-set format, comprising:

providing a reproduction obstructing area having an improper signal for obstructing the reproducing operation in a signal; and transmitting position designation information designating an arraying position of the reproduction obstructing area along with data.

2. A data transmission method for processing input digital data and transmitting the processed digital data in accordance with a pre-set format, comprising:

provanding a reproduction obstructing area obstructing the reproducing operation in a signal; and transmitting position designation information designating an arraying position of the reproduction obstructing area along with data;

wherein said reproduction obstructing area is an area having a special synchronization signal different from a synchronization signal conforming to the standard.

3. The data transmission method as claimed in claim 2 wherein said special synchronization signal differs in transition length from the synchronization signal conforming to the standard.

4. A data transmission method for processing input digital data and transmitting the processed digital data in accordance with a pre-set format, comprising:

providing a reproduction obstructing area obstructing the reproducing operation in a signals; and transmitting position designation information designating an arraying position of the reproduction obstructing area along with data;

wherein said reproduction obstructing area is an area having formed therein pits or grooves having servo disengaging lengths.

5. A data transmission method for processing input digital data and transmitting the processed digital data in accordance with a pre-set format, comprising:

providing a reproduction obstructing area obstructing the reproducing operation in a signal; and transmitting position designation information designating an arraying position of the reproduction obstructing area along with data;

wherein said reproduction obstructing area is a unrecorded area having a servo disengaging length.

6. The data transmission method as claimed in claim 1 wherein said reproduction obstructing area is a reproduction inhibiting area inhibiting data reproduction.

7. The data transmission method as claimed in claim 1 wherein said signal processing of the input digital data includes encryption processing responsive to pre-set key information and wherein at least a portion of the key information for encryption is arrayed in said reproduction obstructing area or directly after said reproduction obstructing area.

8. A data recording apparatus for processing input digital data and recording the processed digital data in accordance with a pre-set format, wherein a reproduction obstructing area having an improper signal for obstructing the reproducing operation is provided in a signal and position designation information designating an arraying position of the reproduction obstructing area is recorded along with data.

9. A data record medium having recorded thereon a reproduction obstructing area having an improper signal for obstructing the reproducing operation in a data recording area and position designation information designating an arraying position of the reproduction obstructing area.

10. A data reproducing apparatus for reproducing a data record medium having recorded thereon a reproduction obstructing area having an improper signal for obstructing the reproducing operation in a data recording area and position designation information designating an arraying position of the reproduction obstructing area, comprising:

position designation information detection means for detecting the position designation information; and reproduction switching control means for controlling the switching of the reproduction of the reproduction obstructing area designated by the position designation information from said position designation information detection means.

* * * * *

UNITED STATES PATENT AND TRADEMARK OFFICE
CERTIFICATE OF CORRECTION

PATENT NO.    :  6,005,839

DATED         :  Dec. 21, 1999

INVENTOR(s)   :  Sako et al.

It is certified that error appears in the above-identified patent and that said Letters Patent is hereby corrected as shown below:

Title page, item [30] should read as following:

FOREIGN APPLICATION PRIORITY DATA:

[30]    Aug. 10, 1995    [JP]    Japan.....................7-204483

Signed and Sealed this

Twenty-fifth Day of July, 2000

Attest:

Attesting Officer

Q. TODD DICKINSON

Director of Patents and Trademarks